Patented Sept. 22, 1936

2,055,050

UNITED STATES PATENT OFFICE 2,055,050

AZO-DYES

Hermann Rohrbach, Wolfen, Germany, assignor to General Aniline Works, Inc., New York, N. Y., a corporation of Delaware No Drawing. Application November 14, 1932, Serial No. 642,681. In Germany November 30, 1931

16 Claims. (Cl. 134—1)

My present invention relates to a process for manufacturing new azo dyes and more particularly of dyes which show an extraordinarily high solubility in organic solvents, oils, fats, waxes and the like.

Further objects of my invention are the new azo dyes obtainable according to the said process.

The new and very valuable azo dyes being the subject matter of the present specification, are obtainable when diazotizing a mono-(aminophenyl)-hexahydrobenzene, a di-(aminophenyl)-hexahydrobenzene or the substitution derivatives of these compounds, these products containing no group rendering water-soluble the amine, and coupling the diazo compound with an azo dye component which contains a completely or partly hydrogenated carbon nucleus and which likewise is free of groups effecting a solubility in water. The dyes thus obtained are extraordinarily soluble in organic solvents, oils, fats, waxes and products produced therefrom and thus have a wide field of application. The dyeings obtained show a good or even very good fastness to light and fastness to sublimation. When compared with the known azo dyes containing no or only one hydrogenated nucleus, the new dyes containing at least two hydrogenated nuclei in their molecule are distinguished by their extremely enhanced solubility in the solvents generally dyed with the so-called fat dyes (Sudan dyes).

The invention is illustrated by the following examples, the parts being by weight:—

Example 1.—29.4 parts of 1-di-(3-methyl-4-aminophenyl)-hexahydrobenzene of the formula

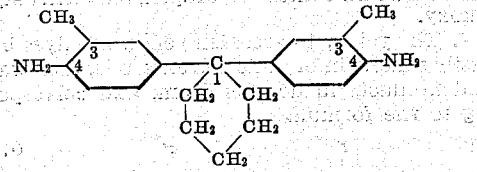

are dissolved while gently warming in 500 parts of water and 60 parts of hydrochloric acid of 20° Bé. and bisdiazotized at a temperature of 0 to 5° C. with 13.8 parts of sodium nitrite dissolved in water. The clear solution of the bisdiazo compound is allowed to run slowly into a suspension of 36 parts of 1-(4-hydroxyphenyl)-hexahydrobenzene in 2000 parts of water and 14 parts of sodium hydroxide cooled to 0° C. The coupling finished, the separated dye is filtered off, pressed, dried at about 50° C. and then ground. It is easily soluble to a deep yellow solution in the usual organic solvents and likewise in fats, oils and waxes. The colorings prepared with this dye are extraordinarily fast to light and to sublimation.

In the foregoing example, 1-di-(3-methyl-4-aminophenyl)-hexahydrobenzene may be substituted with the same effect by 1-di-(3-methyl-4-aminophenyl) - hexahydro-4-methylbenzene obtainable from 4-methylcyclohexanone and 2-methyl-1-aminobenzene.

Example 2.—26.6 parts of 1-di(4 - aminophenyl)-hexahydrobenzene are bisdiazotized as indicated in Example 1 and coupled with a solution of 31 parts of 1.2.3.4-tetrahydro-7-hydroxynaphthalene in 500 parts of water and 14 parts of sodium hydroxide at a temperature of 0 to 3° C. The dye is worked up as indicated in Example 1. It dissolves well to an orange solution in the media enumerated in Example 1 and likewise is extraordinarily fast to light and sublimation.

Example 3.—18.9 parts of 1-(3-methyl-4-aminophenyl)-hexahydrobenzene which may be represented by

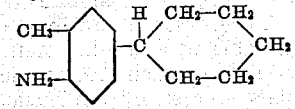

are dissolved in 500 parts of hot water and 15 parts of hydrochloric acid of 20° Bé. and precipitated in the form of the hydrochloride by a further addition of 15 parts of hydrochloric acid of 20° Bé. By addition of 6.9 parts of sodium nitrite dissolved in water, diazotization is carried out at 10 to 15° C., whereupon the clear solution of the diazo compound is allowed to run into a suspension of 18 parts of 1-(4-hydroxyphenyl)-hexahydrobenzene in 1000 parts of water and 7 parts of sodium hydroxide cooled to 0° C. The dye dissolves in organic solvents to a greenish yellow solution and has the properties named in Examples 1 and 2.

Example 4.—22.35 parts of 1-(3(?)-methyl-4(?)-amino-6(?)-chlorophenyl)-hexahydrobenzene (obtainable according to the process disclosed by Bodroux, in C. R. 1928, vol. 186, page 1005, by condensation of cyclohexene with 4-chloro-1-methylbenzene, nitration of the condensation product and reduction) are emulsified by rapidly stirring in 500 parts of hot water. This emulsion is converted in a suspension of the hydrochloride by rapid addition of 30 parts of hydrochloric acid of 20° Bé. The mixture is stirred until cool, further cooled to about 10° C. and diazotized as usual with 6.9 parts of sodium nitrite. To the solution of the diazo compound thus obtained, 22 parts of the hydrochloride of 1-(1-methylaminophenyl)-hexahydrobenzene hydrochloride which may be represented by the formula:

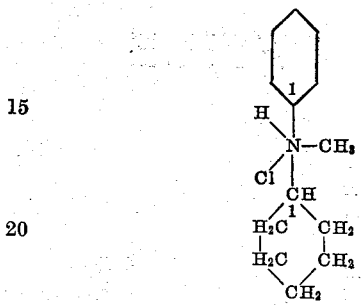

suspended in water, are added, whereafter the free hydrochloric acid formed is substituted by acetic acid by slowly adding a dilute solution of sodium acetate. When no further amount of the dye is formed, the latter is pressed and carefully dried. It is easily soluble to a greenish yellow solution in the media previously named and likewise is fast to sublimation.

The following table shows a number of other dyes obtainable according to the new process and indicates the shades obtainable therewith.

| Diazotized or bisdiazotized component | Coupling component | Shade |
| --- | --- | --- |
| 1 - di - (4 - aminophenyl) - hexahydrobenzene | 1-(4-hydroxyphenyl)-hexahydrobenzene | Greenish-yellow |
| 1-di-(3-methoxy-4-aminophenyl) - hexahydrobenzene | 1-(4-hydroxyphenyl)-hexahydrobenzene | Orange |
| 1 - (3 - methyl - 4 - aminophenyl) - hexahydrobenzene | 1.2.3.4-tetrahydro-8-hydroxynaphthalene | Brown |
| 1- (3.6 - dimethyl(?) aminophenyl) - hexahydrobenzene | 1-(4-hydroxyphenyl)-hexahydrobenzene | Yellow |
| 1 - (3(?) - methyl - 4(?) - amino - 6(?)-chlorophenyl)-hexahydrobenzene | 1.2.3.4-tetrahydro-7-aminonaphthalene | Orange |
| 1 - (4 - aminophenyl) - hexahydrobenzene | 1-(4-hydroxyphenyl)-hexahydrobenzene | Greenish-yellow |
| 1-di-(3-methyl-4-aminophenyl) - hexahydrobenzene | 1-(4-hydroxyphenyl)-2.3.4.5-tetrahydro-benzene | Yellow |

The 1-(3.6-dimethyl ? aminophenyl)-hexahydrobenzene (cf. the first column in the foregoing table) is obtainable in a similar manner as the starting material mentioned in Example 4 according to Bodroux's process, by condensation of cyclohexene with xylene, nitration of the condensation product and reduction. In an analogous manner other substitution products of 1-(aminophenyl)-hexahydrobenzene are obtainable by choosing the correspondent starting materials.

It is obvious that my invention is not limited to the foregoing examples or to the specific details given therein. Thus, for instance, I may use as starting materials a mono- or di(aminophenyl)-hexahydrobenzene which contains other substituents in the benzene nuclei as mentioned in the examples or in the table. Thus, the benzene nuclei may contain ethyl or generally alkyl groups, methoxy, ethoxy, or generally alkoxy radicals.

What I claim is:—

1. The new azo dyes being easily soluble in organic solvents, oils, fats, waxes and products made therefrom, and corresponding to the general formula

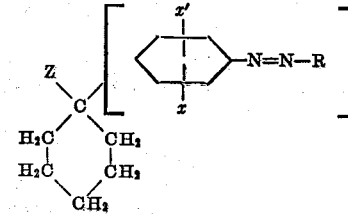

wherein $x$ and $x'$ mean hydrogen, alkyl, halogen, alkoxy, R means a hydrophenylhydroxybenzene-, a hydrophenylaminobenzene-, a tetrahydrohydroxynaphthalene-, a tetrahydroaminonaphthalene-, or an N-cyclohexylaniline radicle and Z is hydrogen or identical with the bracketed part of the formula.

2. The new azo dyes being easily soluble in organic solvents, oils, fats, waxes and products made therefrom, and corresponding to the general formula wherein $x$ and $x'$ mean hydrogen, alkyl, halogen, alkoxy and Z is hydrogen or identical with the bracketed part of the formula.

3. The yellow to greenish yellow azo dyes being easily soluble in organic solvents, oils, fats, waxes, and products made therefrom, and corresponding to the formula wherein $x$ and $x'$ mean hydrogen, halogen, alkyl or alkoxy.

4. The yellow to greenish yellow azo dyes being easily soluble in organic solvents, oils, fats, waxes, and products made therefrom, and corresponding to the formula wherein $x$ and $x'$ mean hydrogen, halogen, alkyl or alkoxy.

5. The greenish yellow azo dye being easily soluble in organic solvents, oils, fats, waxes, and products made therefrom, and corresponding to the formula

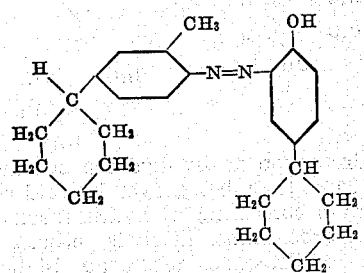

6. The yellow azo dye being easily soluble in organic solvents, oils, fats, waxes, and products made therefrom, and corresponding to the formula

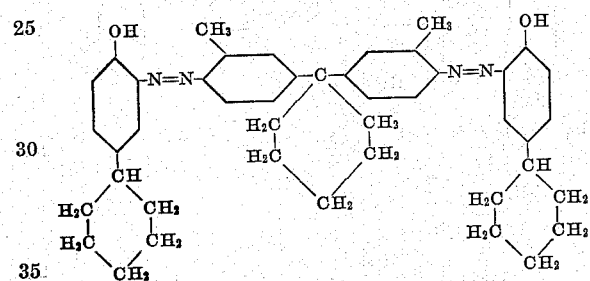

7. The process which comprises diazotizing a compound of the general formula

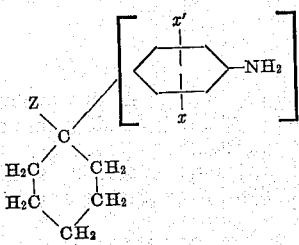

wherein $x$ and $x'$ mean hydrogen, alkyl, halogen or alkoxy and Z is hydrogen or identical with the bracketed part of the formula, and coupling the diazo compound with an azo component containing a hydrogenated carbon nucleus.

8. The process which comprises diazotizing a compound of the general formula

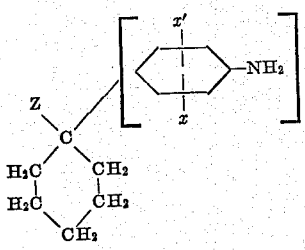

wherein $x$ and $x'$ mean hydrogen, alkyl, halogen or alkoxy and Z is hydrogen or identical with the bracketed part of the formula and coupling the diazo compound with 1-(4-hydroxyphenyl)-hexahydrobenzene.

9. The process which comprises diazotizing a 1-(phenylamino)-hexahydrobenzene of the formula

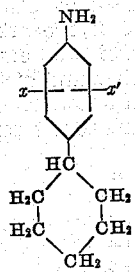

wherein $x$ and $x'$ mean hydrogen, alkyl, halogen or alkoxy and coupling it with 1-(4-hydroxyphenyl)-hexahydrobenzene.

10. The process which comprises diazotizing a 1-di-(phenylamino)-hexahydrobenzene of the formula

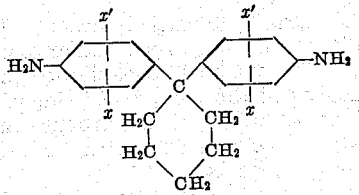

wherein $x$ and $x'$ mean hydrogen, alkyl, halogen or alkoxy and coupling it with 1-(4-hydroxyphenyl)-hexahydrobenzene.

11. A composition substantially comprising an azo dye corresponding to the general formula

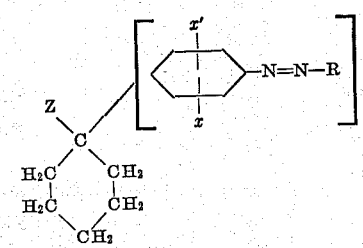

wherein $x$ and $x'$ mean hydrogen, alkyl, halogen, alkoxy, R means a hydrophenylhydroxybenzene-, a hydrophenylaminobenzene-, a tetrahydro-hydroxynaphthalene-, a tetrahydroaminonaphthalene, or an N-cyclohexylaniline radicle and Z is hydrogen or identical with the bracketed part of the formula, and a hydrocarbon or oxy-hydrocarbon material, which is capable of being dyed by said azo dye, of the group consisting of hydrocarbons, halogenated hydrocarbons, alcohols, ethers, esters, acetone, fats, oils, waxes, resins, and higher fatty acids.

12. A composition substantially comprising an azo dye corresponding to the general formula

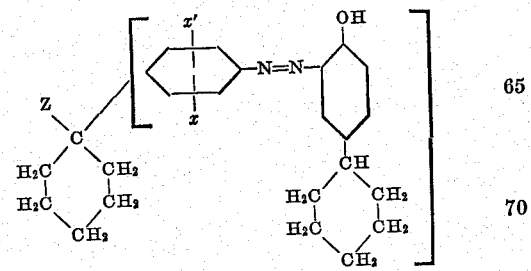

wherein $x$ and $x'$ mean hydrogen, alkyl, halogen, alkoxy, and Z is hydrogen or identical with the bracketed part of the formula, and a hydrocarbon or oxy-hydrocarbon material, which is capable of being dyed by said azo dye, of the group consisting of hydrocarbons, halogenated hydrocarbons, alcohols, ethers, esters, acetone, fats, oils, waxes, resins, and higher fatty acids.

13. A composition substantially comprising an azo dye corresponding to the general formula.

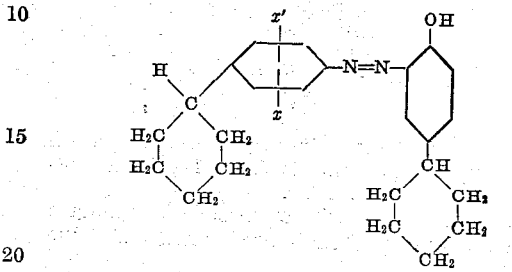

wherein $x$ and $x'$ means hydrogen, halogen, alkyl or alkoxy, and a hydrocarbon or oxy-hydrocarbon material, which is capable of being dyed by said azo dye, of the group consisting of hydrocarbons, halogenated hydrocarbons, alcohols, ethers, esters, acetone, fats, oils, waxes, resins, and higher fatty acids.

14. A composition substantially comprising an azo dye corresponding to the formula

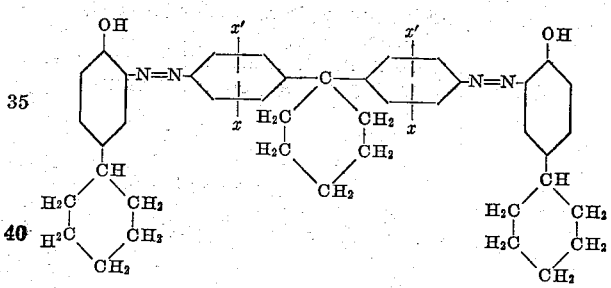

wherein $x$ and $x'$ mean hydrogen, halogen, alkyl or alkoxy, and a hydrocarbon or oxy-hydrocarbon material, which is capable of being dyed by said azo dye, of the group consisting of hydrocarbons, halogenated hydrocarbons, alcohols, ethers, esters, acetone, fats, oils, waxes, resins, and higher fatty acids.

15. A composition substantially comprising an azo dye corresponding to the general formula

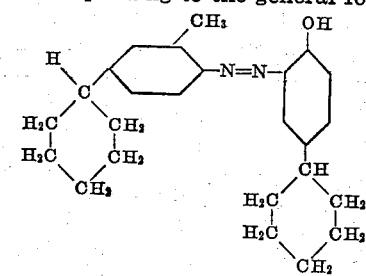

and a hydrocarbon or oxy-hydrocarbon material, which is capable of being dyed by said azo dye, of the group consisting of hydrocarbons, halogenated hydrocarbons, alcohols, ethers, esters, acetone, fats, oils, waxes, resins, and higher fatty acids.

16. A composition substantially comprising an azo dye corresponding to the formula

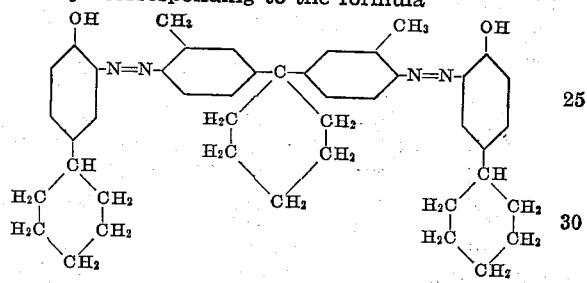

and a hydrocarbon or oxy-hydrocarbon material, which is capable of being dyed by said azo dye, of the group consisting of hydrocarbons, halogenated hydrocarbons, alcohols, ethers, esters, acetone, fats, oils, waxes, resins, and higher fatty acids.

HERMANN ROHRBACH.